United States Patent [19]

Adinolfe et al.

[11] Patent Number: 5,468,025
[45] Date of Patent: Nov. 21, 1995

[54] SEWER LINE VENT CLAMP ASSEMBLY

[76] Inventors: Nicholas Adinolfe, 2534 Transit Rd.;
Joseph P. Adinolfe, 2770 Coomer Rd.,
both of Newfane, N.Y. 14108

[21] Appl. No.: 305,850

[22] Filed: Sep. 14, 1994

Related U.S. Application Data

[63] Continuation-in-part of Ser. No. 81,099, Jun. 25, 1993, abandoned.

[51] Int. Cl.$^6$ ..................................................... F16L 55/07
[52] U.S. Cl. ........................... 285/114; 285/415; 285/420
[58] Field of Search .................................... 285/420, 368, 285/337, 114, 104, 412, 413, 414, 415

[56] References Cited

U.S. PATENT DOCUMENTS

| | | |
|---|---|---|
| 2,606,574 | 8/1952 | Lefebvre . |
| 3,252,192 | 5/1966 | Smith . |
| 4,026,586 | 5/1977 | Kennedy, Jr. et al. . |
| 4,336,959 | 6/1982 | Roche . |
| 4,432,572 | 2/1984 | Thalmann ................................ 285/412 |
| 4,635,970 | 1/1987 | Haines . |
| 4,865,298 | 9/1989 | Jordan . |
| 4,896,902 | 1/1990 | Weston . |
| 5,090,742 | 2/1992 | Cohen et al. . |
| 5,161,828 | 11/1992 | Hynes et al. . |

FOREIGN PATENT DOCUMENTS

| | | | |
|---|---|---|---|
| 687807 | 6/1964 | Canada .................................... | 285/104 |
| 340110 | 11/1989 | European Pat. Off. ............... | 285/337 |

Primary Examiner—Randolph A. Reese
Assistant Examiner—Heather Chun Shackelford
Attorney, Agent, or Firm—Richard C. Litman

[57] ABSTRACT

The present invention relates to clamps which frictionally and releasibly engage two axially aligned pipes to prevent forced separation of the pipes. More specifically, the present invention relates to a sewer line vent clamp assembly having a novel double circumferential ribbing for effectively gripping thin-walled polyvinylchloride (PVC) tubing, and releasibly fixing a thin-walled PVC pipe to a standard, flanged sewer trap. The present invention effectively connects a PVC vent pipe to a sewer trap without piercing or distorting the thin wall of the PVC vent pipe.

2 Claims, 3 Drawing Sheets

SEWER LINE VENT CLAMP ASSEMBLY

This application is a continuation-in-part of application Ser. No. 08/081,099, filed Jun. 25, 1993, now abandoned.

BACKGROUND OF THE INVENTION

1. Field of the Invention

The present invention relates to clamps which frictionally and releasibly engage two axially aligned pipes to prevent forced separation of the pipes. More specifically, the present invention relates to a sewer line vent clamp assembly having a novel double circumferential ribbing for effectively gripping thin-walled polyvinylchloride (PVC) tubing, and releasibly fixing a thin-walled PVC pipe to a standard, flared sewer trap. The present invention effectively connects a PVC vent pipe to a sewer trap without piercing or distorting the thin wall of the PVC vent pipe.

2. Description of the Prior Art

As shown in the patent literature, frictional clamp assemblies for spanning the connection between two axially connected pipes have been patented in the past. In some cases, the clamp assemblies are only temporarily positioned about the pipes to immobilize them while a primary joint between the two pipes is made (as, for instance, by welding). In other cases, the clamp assemblies are designed to remain in place about the pipes even after the primary joining of the two pipes has been completed. The configurations of these various prior art pipe clamps differ according to the type of pipe which is being joined, e.g., glass, ceramic, metal; end-to-end abutting connection, male-female connection, etc.

U.S. Pat. No. 4,336,959, issued Jun. 29, 1982, to Charles Roche describes a restrainer for a joint in plastic conduit. The device includes a solid "retainer" ring, and a "clamping" ring which are drawn together by bolts. The clamping ring consists of two semi-circular elements which are biased about the periphery of one of the pipes being joined by bolts passing through end flanges in each of the semi-circular elements. At least one of the pipes being joined by this device must have an annular, outwardly extending "corrugation" at the end which abuts the joint to the other pipe. The diameter of the corrugation must be larger than the inside diameter of the solid retainer ring. In operation, the solid retainer ring is then slipped over the other end of the corrugated pipe, and biased against the corrugation. The clamping ring is then fitted to another pipe (depicted as a smooth pipe in FIG. 1), and the two pipes are biased to one another by longitudinal bolts passing through both the retainer ring and the clamping ring. As is shown in the drawings, this device relies on the corrugation of at least one of the pipes to maintain the solid retainer ring in place. Clearly, this device cannot be used to join two smooth pipes because there would be no means to keep the solid ring fastened about one of the pipes A reinforced high temperature glass conduit is described in U.S. Pat. No. 2,606,574, issued Aug. 12, 1952, to Lefebvre. FIG. 3 of this patent depicts a conventional pipe clamp assembly for joining two flared-end glass tubes in end-to-end abutment. The pipe clamp assembly includes two identical halves, each having two semi-circular elements releasibly fastened around the circumference of a pipe. The two halves, along with the pipes to which they attached, are then biased toward one another using longitudinal bolts. No ribbing of any sort is shown on the inside diameter of either of the two halves of the assembly.

U.S. Pat. No. 3,252,192, issued May 24, 1966, to Joseph B. Smith, discloses a frictional clamp ring assembly for connecting axially disposed pipes. In identical fashion to the Lefebvre apparatus, above, Smith describes a pipe clamp apparatus having two identical halves, each half consisting of two semi-circular elements biased together by bolts. The two halves, and the pipes to which they are attached, are then biased together by longitudinal bolts. The frictional engagement of the semi-circular elements onto the pipes is enhanced by an epoxy coating interposed between the inner diameter of the semi-circular elements and the surface of the pipe being clamped. To further increase the attachment of the entire assembly to the pipe joint, a material filler having a hardness greater than that of the pipes themselves, preferably steel shot, is incorporated into the epoxy. No ribbing of any sort is shown on the inside diameter of either of the two halves of the assembly. A major drawback to this device is that the epoxy layer permanently fixes the clamp assembly to the joined pipes. Should one or both of the pipes require replacement, it would be a very difficult matter to remove the clamp assembly from the pipe to be replaced. Also, this invention is not particularly suitable for application to PVC pipe because the steel shot contained within the epoxy would penetrate a great distance into a comparatively soft PVC pipe, thereby greatly weakening it.

U.S. Pat. No. 4,026,586, issued May 31, 1977, to Harold Kennedy, Jr. et al, discloses a plain end pipe joint assembly in which a corrugated sleeve of material is wrapped about the ends of two pipes. The sleeve is then tightened via bolts to join the two pipe ends together. A non-corrugated shim sleeve may be interposed between the corrugated sleeve and the pipes to ensure a better seal at the joint. However, since Kennedy's corrugations are blunt, and are positioned parallel with the longitudinal axis of the pipe, this device is less effective in preventing longitudinal separation of the pipes relative to each other compared to the strong fit of the present invention, which includes a plurality of circumferentially arranged ribs positioned perpendicularly to the longitudinal axis of the pipe joint.

U.S. Pat. No. 4,635,970, issued Jan. 13, 1987, to Robert E. Haines, discloses a thrust anchor apparatus for strengthening and stabilizing joints in water supply pipes against the forces exerted on the pipes by water flowing through them. The Haines reference describes an anchor system which incorporates two clamps, each of which is welded onto a pipe adjacent to the end being connected. Rod-like members are used to urge the clamps, and the pipes to which they are welded, together. As noted above, the disadvantage of fixedly attaching the clamps to the pipes is that the pipes themselves cannot be replaced without also replacing the anchoring apparatus.

U.S. Pat. No. 4,865,298, issued Sep. 12, 1989, to Peter Jordan, discloses a tuyere stock for blast furnaces which exemplifies a type of clamping assembly utilized when a connection between two pipes is displaceable in an axial direction.

An example of a pipe coupling or clamp having a nonplanar inner surface is shown in U.S. Pat. No. 4,896,902, issued Jan. 30, 1989, to Richard S. Weston. The Weston pipe coupling device allows for pipes having differing outer diameters to be connected in axial alignment with one another. This device consists of a single clamp assembly having two semi-circular halves. The two halves are releasibly fastened together by bolts passing through flanges in each half.

U.S. Pat. No. 5,090,742, issued Feb. 25, 1992, to Jack L.

Cohen et al, and U.S. Pat. No. 5,161,828, issued on Nov. 10, 1992, to Joseph H. Hynes et al, further represent the state of the art regarding pipe clamps which span two pipes already joined by a primary connector. Cohen et al also describes using a liner between the clamp and the pipe to ensure a snug fit between the pipe and the clamp itself.

None of the above patent references, taken alone or in any combination, is seen as anticipating or fairly suggesting the presently claimed invention.

SUMMARY OF THE INVENTION

The present invention is a sewer line vent clamp assembly which, when installed over a joint between a main sewer trap and a vent pipe connected to the trap, will prevent the forced separation of the pipes from one another. This commonly occurs in temperate regions when the frost in the ground actually grasps the vent pipe, lifting it from the seal in the trap. As a result of the breached joint between the vent and the trap, the sewer system is now open for influent groundwater infiltration into the sewer trap.

Initially, this does not present an acute problem to a home served by the sewer, but may prove very costly to a business served by the same sewer system. The introduction of ground water into the sewer system produces a greater volume of waste water to be treated by municipal water treatment plants. This, in turn, artificially inflates the apparent volume of waste water generated by the business served by the water treatment plant. Due to increasingly strict federal regulations regarding waste generation and disposal, such an apparently inflated volume of waste water generation may result in the imposition of enormous fines, or even the forced cessation of the business by government regulators. Clearly then, a pipe connector which prevents ground water from entering a sewer trap joint would be heartily embraced by any business served by a municipal waste water treatment system.

The same problem occurs in residential structures, as well. The present invention works equally well in a residential setting, and would serve to reduce the total amount of residential waste water entering a municipal water treatment plant. This behooves the entire community since it reduces the net operating time of the treatment plant, thereby lessening the cost of operation of the treatment plant, while also reducing wear and tear on the plant.

The present invention is a pipe clamp assembly comprising two clamp sets, each clamp set comprising two semicircular arcuate members. Each clamp set includes radially-mounted securing flanges for releasibly fastening the two arcuate members together around the outer circumference of a pipe via nuts and bolts. Connecting flanges extend both radially and circumferentially from the outer surface of each clamp set. The connecting flanges are engageable with long bolt-like members, which urge the clamp sets, and the pipes to which they are attached, together.

The two clamp sets of the present invention differ in that one of the clamp sets has an inner surface which is smooth and of substantially the same diameter as the outer diameter of a sewer trap line (which is normally a steel or ceramic pipe having a flared, bell-type, female end). It is this clamp set which may be fastened to the sewer trap which leads to the water treatment plant.

The other clamp set has an inner surface which includes a plurality of ribs which are spaced in two distinct, widely separated regions. Between the two regions having ribs is an unribbed region. This clamp set may be fastened to a thin-walled PVC vent pipe which leads from the structure being served to the sewer trap. The vent pipe is normally a straight-end (male), thin-walled PVC pipe which fits inside the female end of the sewer trap. The male-female joint between the vent pipe and the sewer trap forms a primary joint between the vent and the sewer trap. The widely separated regions of ribbing on this clamp set provide a maximum strength attachment of the clamp set to the PVC piping without piercing or distorting the PVC pipe.

Accordingly, is a principal object of the present invention to provide a pipe clamp assembly which prevents the separation of a sewer trap and vent pipe by frictionally connecting the two pipes together about their primary joint.

It is another object of the invention to provide a pipe clamp assembly wherein at least one set of clamps of the assembly has a plurality of circumferentially spaced ribs disposed in two widely separated regions on an inner surface thereof such that when the pipe clamp assembly is positioned on the outer cylindrical surface of a pipe joint it will resist radial and longitudinal movement of the pipes.

It is a further object of the invention to provide a clamp assembly capable of strengthening the joining of two pipes by interacting with the shaped end configuration of one pipe and the outer cylindrical surface of the other pipe.

Still another object of the invention is to prevent the axial displacement of two pipes connected together by a primary joint by utilizing a pipe clamp assembly having two, two-piece, clamp sets, each releasibly attached to a pipe and easily interchangeable therefrom should either of the two pipes need replacing, and urged toward one another by longitudinally positioned connector rods.

These and other objects of the invention will become readily apparent upon further review of the following specification and drawings.

BRIEF DESCRIPTION OF THE DRAWINGS

Identical reference characters are used to represent the same or similar features consistently throughout the various drawings.

DETAILED DESCRIPTION OF THE PREFERRED EMBODIMENT

The present invention is an apparatus for preventing the forced separation of a sewer trap 102 from a vent line 100. The present invention accomplishes this task by connecting sewer trap 102 and vent line 100 by means of an exterior, easily adaptable, and releasible clamping assembly 10.

Figure 1:
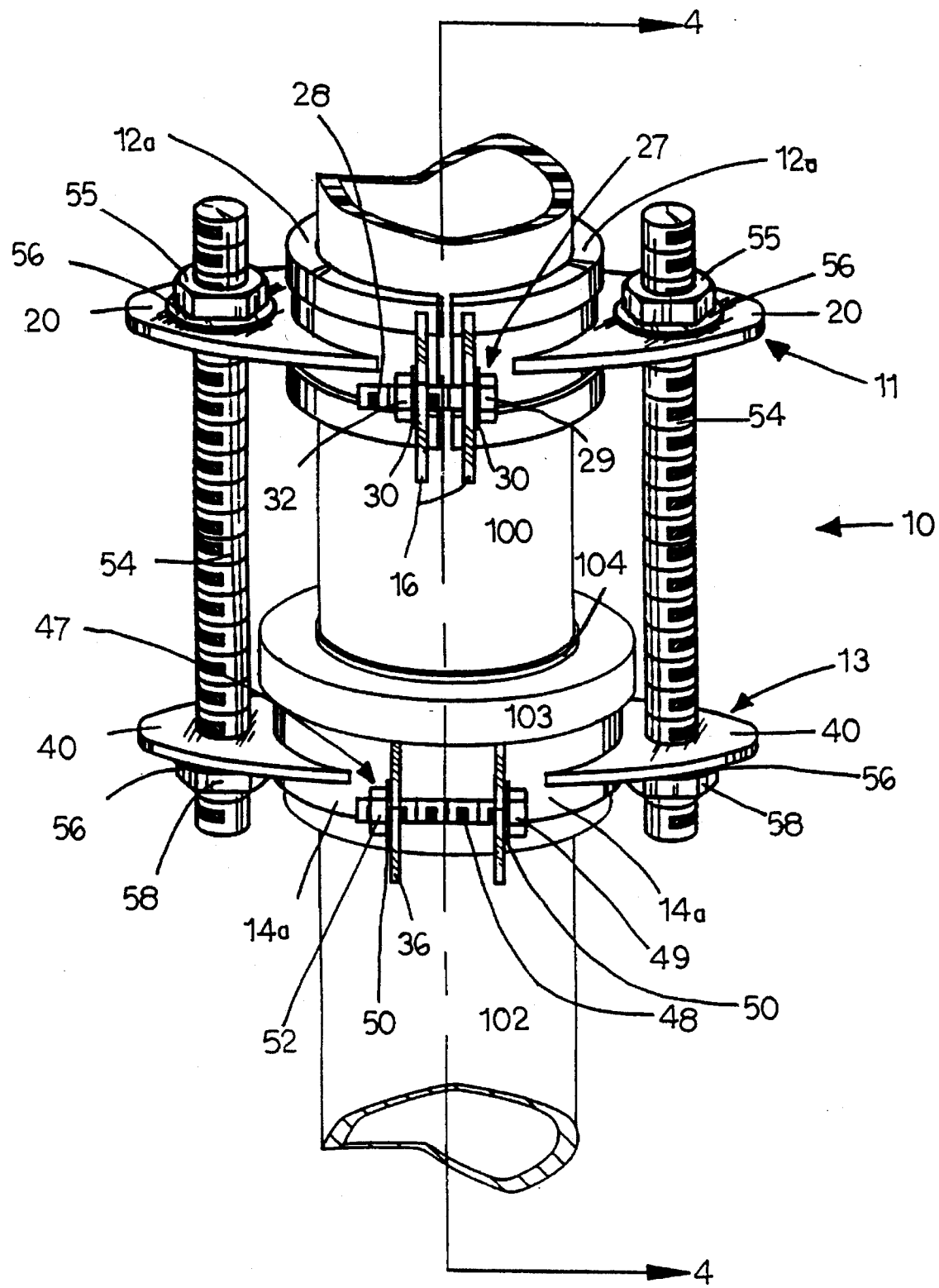
FIG. 1 is an environmental perspective view of the sewer line vent clamp assembly attached to a sewer trap and a sewer vent pipe.

Referring now to FIG. 1, clamp assembly 10 is shown spanning primary joint 104 which is the primary connection between sewer trap 102 and vent line 100. Clamp assembly 10 comprises three main components, a first clamp set 11, a second clamp set 13, and connector rods 54. The first clamp set 11 comprises two arcuate-shaped members 12a, each preferably having 180 degrees of arcuate surface. Each member has at least two securing flanges 16 and 17 (see FIG. 2) extending radially from the ends thereof, and a connector flange 20 extending radially from a center portion of the arcuate member. The connector flange 20 is positioned perpendicularly to securing flanges 16 and 17. The two arcuate members 12a are connected to each other, and disposed about the exterior circumference of vent line 100 via releasable fasteners 27, preferably nut and bolt-type fasteners.

Releasable fasteners 27 may include a partially threaded bolt member 28, washers 30, and a matingly threaded nut 32 for attachment to the threaded end of bolt member 28. Two sets of releasable fasteners 27 are normally used, one set engaging securing flanges 16, and another set engaging securing flanges 17.

Figure 2:
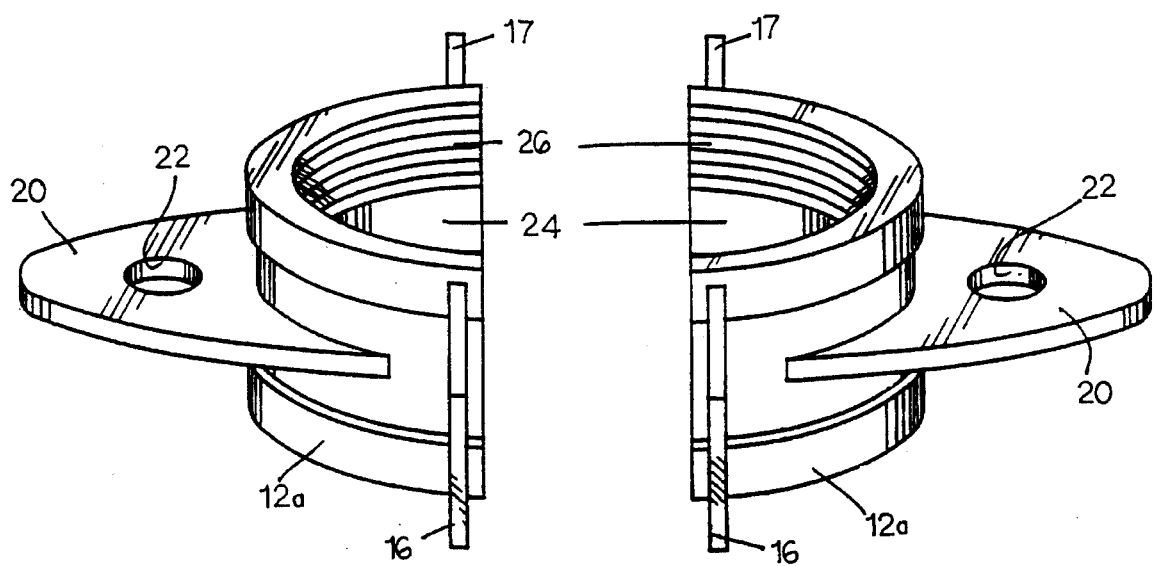
FIG. 2 is a perspective view of the arcuate members of the first clamp set showing the ribbing on the inner surface of the arcuate members.

Referring now to FIG. 2, to ensure that first clamp set 11 will not displace longitudinally along the outer surface of vent line 100, the inner surfaces of arcuate members 12a are scored in such a manner that a plurality of ribs 26 are raised between thread-like grooves creating ridges of triangular cross-section. The ribs are situated in two widely separated circumferential locations, near the edges of the arcuate members 12a, and are separated by annular space 24 having no ridges. The circumferential ribs 26, spaced apart by smooth area 24, are superior to any other type of frictional grip enhancer and requires no additional epoxies, materials or sleeves to be incorporated into clamp set 11 or placed onto or around vent line 100. The spaced ribs 26 firmly grip thin-walled PVC piping with sufficient force to completely immobilize the pipe without deforming it.

Figure 3:
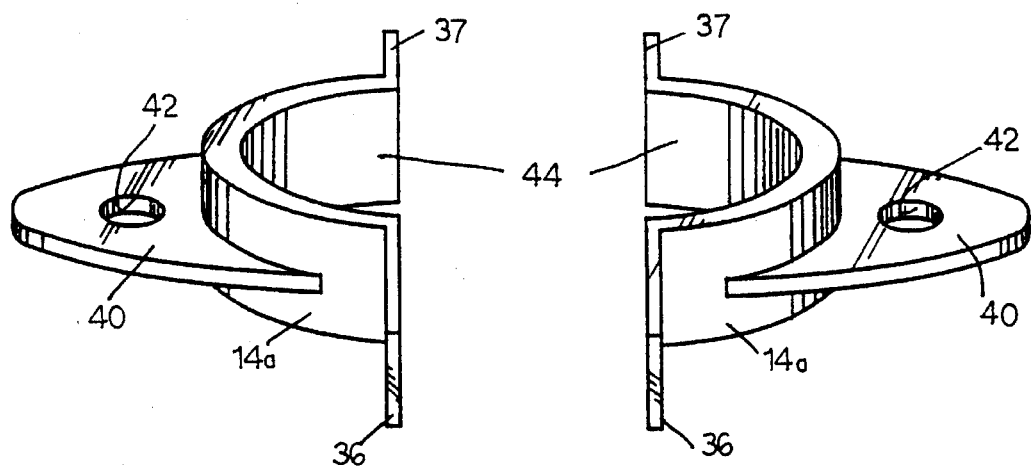
FIG. 3 is a perspective view of the arcuate members of the second clamp set showing the construction thereof.

Referring now to FIGS. 1 and 3, sewer trap 102 terminates in an outwardly flared bell housing 103 for accepting vent line 100. Second clamp set 13 is shown secured around the circumference of sewer trap 102 in a manner similar to that in which first clamp set 11 is secured about vent line 100. The difference here is that second clamp set 13 abuts the flared bell housing of sewer trap 102.

In identical fashion to the first clamp set, the second clamp set 13 includes two identically shaped arcuate members 14a, each having securing flanges 36 and 37 extending radially from the ends thereof, and a connector flange 40 located in a center portion of each member 14a. Two releasable fastener assemblies 47, preferably nut and bolt assemblies, are provided. These releasable fasteners are identical to fasteners 27, described above, and include threaded bolts 48, washers 50, and internally threaded nuts 52.

Figure 4:
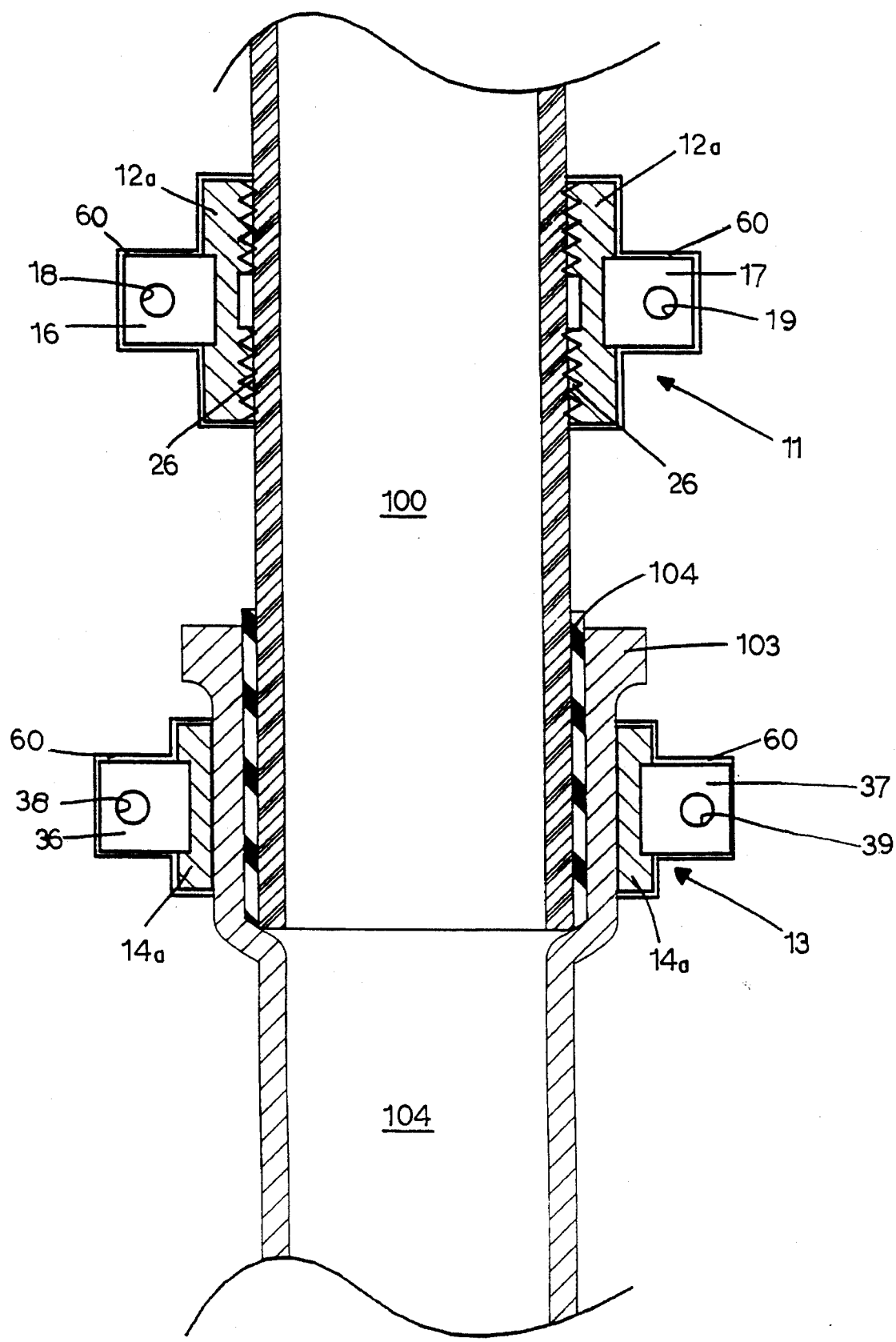
FIG. 4 is a sectional view of FIG. 1 taken along line 4—4 to illustrate the connection between the clamp assembly and the pipes.

As noted above, sewer trap 102 includes a bell housing 103 which can be used as a surface on which to bias second clamp set 13. Therefore, arcuate members 14a of second clamp set 13 may have a smaller longitudinal width than arcuate members 12a, as well as smooth inner surfaces 44 since the presence of the flared bell will prevent the second clamp set 13 from sliding off the end of the sewer trap. The longitudinal width and the ribs required by first clamp set 11 are not required to be incorporated within the second clamp set 13 due to the flared bell housing 103 of trap line 102 (see FIG. 4).

Optionally, to ensure that clamp assembly 10 will not experience excessive corrosion and deterioration, both the first and second clamp sets 11 and 13, respectively, may be protected with a water-proof coating 60 applied thereto. The coating may be, for instance, tar pitch, oil, waxes, polyurethane coatings, polyacrylic coatings, and the like.

Tension on primary joint 104 from clamp assembly 10 is controlled and adjusted by rod connectors 54. Rod connectors 54 are threaded members each engageable with matingly threaded end nuts 55. When assembled, each rod connector 54 passes through openings 22 and 42 of connector flanges 20 and 40 of arcuate members 12a and 14a, respectively. Optionally, washers 56 may be inserted between end nuts 55 and connector flanges 20.

In identical fashion, matingly threaded nuts 58 engage rod connectors 54 after passing through openings 42 of connector flanges 40. To draw vent line 100 and trap line 102 closer together, the tension on rod connectors 54 is increased by tightening nuts 58, which urges first clamp set 11 and second clamp set 13 toward one another, whereby the seal between trap line 102 and vent line 100 is tightened. Conversely, should primary joint 104 need to be loosened or disconnected entirely, nuts 58 need only be unscrewed and the clamp assembly can be axially pulled apart.

It is to be understood that the present invention is not limited to the sole embodiment described above, but encompasses any and all embodiments within the scope of the following claims.

We claim:

1. A sewer line vent clamp assembly in combination with a sewer vent pipe and a sewer trap, said sewer vent pipe being a thin-walled PVC sewer vent pipe having a substantially smooth outer circumference, said sewer trap having a flared housing on one end thereof to accept said thin-walled PVC sewer vent pipe thereby defining a primary joint between said sewer vent pipe and said sewer trap, said sewer line vent clamp assembly comprising:

a first and a second clamp set removably connected to each other;

said first clamp set consisting of a first arcuate member and a second arcuate member, each arcuate member having an outer circumferential surface, and an inner circumferential surface having dimensions substantially the same as the outer circumference of said thin-walled PVC sewer vent pipe about which the first clamp set is placed, each of said arcuate members having two securing flanges extending radially from circumferential ends of said arcuate members and a connecting flange extending radially and circumferentially from said outer circumferential surface, said first and said second arcuate members of said first clamp set being biased against each other with said thin-walled PVC sewer vent pipe therebetween by releasable fasteners which engage said securing flanges extending from the ends of said first and second arcuate members, said first and said second arcuate members of said first clamp set having on the inner circumferential surface thereof a plurality of ribs having a triangular cross-section and located in two widely separated edge regions extending circumferentially across said inner circumferential surface;

said second clamp set consisting of a third and a fourth arcuate member, each arcuate member having an outer surface and two securing flanges extending radially from circumferential ends thereof, and a connecting flange extending radially and circumferentially from each of said outer surface of said arcuate members, said third and said fourth arcuate members of said second clamp set being held against each other with said sewer trap therebetween by releasable fasteners which engage said securing flanges extending from the ends of said third and fourth arcuate members, said third and said fourth arcuate members having a smooth inner surface for engaging said sewer trap about its flared housing; and connecting means for releasably connecting said first and said second clamp sets, said connecting means being rod elements having threaded ends and matingly threaded nuts capable of being threadibly secured thereto, said rod elements engaging said first and second clamp sets through said connecting flanges, whereby;

installation of the sewer line vent clamp assembly securely connects the thin-walled PVC sewer vent pipe and the sewer trap together to prevent the introduction of ground water into a sewer system.

2. The combination according to claim 1, wherein said sewer line vent clamp assembly includes a water-proof coating applied to said first, second, third, and fourth arcuate members.

* * * * *